US 6,729,951 B2

(12) United States Patent
Hoskinson et al.

(10) Patent No.: US 6,729,951 B2
(45) Date of Patent: May 4, 2004

(54) METHOD AND APPARATUS FOR SELECTIVELY HARVESTING MULTIPLE COMPONENTS OF A PLANT MATERIAL

(75) Inventors: Reed L. Hoskinson, Rigby, ID (US); J. Richard Hess, Idaho Falls, ID (US); Kevin L. Kenney, Idaho Falls, ID (US); John M. Svoboda, Idaho Falls, ID (US); Thomas D. Foust, Idaho Falls, ID (US)

(73) Assignee: Bechtel Bwxt Idaho, LLC, Idaho Falls, ID (US)

( * ) Notice: Subject to any disclaimer, the term of this patent is extended or adjusted under 35 U.S.C. 154(b) by 0 days.

(21) Appl. No.: 10/112,021

(22) Filed: Mar. 28, 2002

(65) Prior Publication Data

US 2003/0186730 A1 Oct. 2, 2003

(51) Int. Cl.⁷ .............................. A01F 12/52; A23N 5/00
(52) U.S. Cl. ............................. 460/14; 460/13; 460/63
(58) Field of Search ............................ 460/14, 13, 63, 460/76, 99, 101; 56/341; 100/88

(56) References Cited

U.S. PATENT DOCUMENTS

| | | | | |
|---|---|---|---|---|
| 2,158,745 A | * | 5/1939 | Dalimata | 100/45 |
| 2,212,465 A | * | 8/1940 | Baldwin | 56/10.6 |
| 3,448,566 A | * | 6/1969 | Van der Lely | 56/14.6 |
| 3,485,016 A | * | 12/1969 | Soteropulos et al. | 56/16.4 D |
| 3,907,139 A | * | 9/1975 | Luscombe | 100/100 |
| 3,983,883 A | * | 10/1976 | Ashton et al. | 460/85 |
| 4,489,734 A | * | 12/1984 | Van Overschelde | 460/81 |
| RE31,860 E | | 4/1985 | Decoene et al. | |
| 4,606,355 A | * | 8/1986 | Dammann | 460/69 |
| 4,663,921 A | * | 5/1987 | Hagstrom et al. | 56/14.6 |
| 4,846,198 A | * | 7/1989 | Carnewal et al. | 460/21 |
| 4,946,419 A | | 8/1990 | Cromheecke et al. | |
| 4,976,654 A | * | 12/1990 | Dammann et al. | 460/80 |
| 5,421,777 A | | 6/1995 | Strubbe et al. | |
| 5,556,337 A | * | 9/1996 | Tophinke et al. | 460/70 |
| 5,794,423 A | | 8/1998 | McLeod | |
| 5,795,222 A | | 8/1998 | McLeod | |
| 5,873,226 A | | 2/1999 | McLeod | |
| RE37,267 E | | 7/2001 | Mosby | |
| 6,327,970 B1 | | 12/2001 | Kooima et al. | |

FOREIGN PATENT DOCUMENTS

| | | | | |
|---|---|---|---|---|
| DE | 3409951 A1 | * | 9/1985 | A01F/12/18 |
| FR | 2620896 A1 | * | 3/1989 | A01D/41/02 |
| SU | 1727678 A1 | * | 4/1992 | A01D/41/00 |

OTHER PUBLICATIONS

English translation of French Patent No. 2 620 896 to Barraquet et al., published Mar. 31, 1989.
McLeod Harvest Home Page, http://www.mcleodharvest.com/mharvest.html, visited Dec. 28, 2001.

* cited by examiner

Primary Examiner—Árpád F Kovács
(74) Attorney, Agent, or Firm—Trask Britt P.C.

(57) ABSTRACT

A method and apparatus for selectively harvesting multiple components of a plant material. A grain component is separated from the plant material such as by processing the plant material through a primary threshing and separating mechanism. At least one additional component of the plant material is selectively harvested such as by subjecting the plant material to a secondary threshing and separating mechanism. For example, the stems of a plant material may be broken at a location adjacent one or more nodes thereof with the nodes and the internodal stem portions being subsequently separated for harvesting. The at least one additional component (e.g., the internodal stems) may then be consolidated and packaged for subsequent use or processing. The harvesting of the grain and of the at least one additional component may occur within a single harvesting machine, for example, during a single pass over a crop field.

37 Claims, 4 Drawing Sheets

METHOD AND APPARATUS FOR SELECTIVELY HARVESTING MULTIPLE COMPONENTS OF A PLANT MATERIAL

The United States Government has rights in this invention pursuant to Contact No. DE-AC07-99ID13727 with Bechtel BWXT Idaho, LLC.

BACKGROUND OF THE INVENTION

1. Field of the Invention

The present invention relates generally to harvesting crop materials and, more particularly, to the selective harvesting of multiple components of such a crop material desirably in a single pass across a crop field with a harvesting machine.

2. State of the Art

In known combine harvesters, a crop or plant material is cut from the field and passed through a threshing and separating mechanism to separate the grain therefrom. The grain, along with other impurities such as, for example, chaff, dust, leaves or other straw particles, is fed to a cleaning mechanism to further clean and separate the grain from such impurities. Such a cleaning mechanism might include one or more sieves with an air stream directed therethrough to assist in the removal of chaff and residual straw.

The grain, now separated and cleaned from the crop material, is collected and temporarily stored in a grain tank located on the combine harvester while the residual material (i.e., material other than grain) is conventionally discharged from the combine harvester back onto the crop field. In some combine harvesters the residual material may be "rethreshed" such as by recycling it through the threshing and separating mechanism to increase the amount of grain recovered.

The residual materials, such as the straw and chaff, may be discharged from the combine harvester in scattered manner for reintroduction into the soil as a nutrient therefor, or they may be discharged in a narrow row for subsequent collection by another machine. For example, a baler may pass across the field to collect and package (bale) the discharged residual material. However, a conventional baler has no separation equipment associated therewith and packages everything it collects from the field. For example, the baler cannot separate the straw from the chaff. Rather, it consolidates and packages the chaff and the straw along with any other residual material discharged from the combine harvester.

The requirement of returning to the field to collect and package residual material introduces additional time and costs to the harvesting of a given crop. Further, this conventional approach is generally inefficient in the sense that it may be desirable to use some components of the crops as a soil nutrient, while other components may be better suited for other uses. However, as noted above, current baling technologies are "all or nothing" since they do not offer the ability to further separate the residual material.

One process which attempts to minimize the amount of material which is discharged back to the field is known as the "McLeod Harvest" and is described in U.S. Pat. No. 5,873,226 issued to McLeod on Feb. 23, 1999. The McLeod Harvest threshes the grain in the field and then separates the crop into two portions. The first portion contains substantially all of the straw from the threshed crop and a second portion includes substantially all of the chaff, grain, grain leavings and weed seeds. The first portion is returned to the field during separation while the second portion comprising its various components is transported to a processing plant for separation of the grain from the chaff, grain leavings and weed seeds. The chaff, grain leavings and weed seeds are collectively compacted and crushed in a mill for use as animal feed. The process is purported to increase the amount of grain recovered and to remove weed seeds from the field. The straw is collected in a separate pass over the field as with harvesting with a conventional combine harvester.

One of the principal objectives of the McLeod Harvest is the removal of weed seeds from the crop field. However, the McLeod Harvest process requires a separate mill for separation of the grain from the weed seeds, grain leavings and chaff. Further, the process still requires another pass with a baler to collect the straw as the straw is not the component of a crop conventionally used as a soil nutrient.

As noted above, some uses of the residual material (regardless of the process used to separate the grain therefrom) may provide a farmer with additional revenues from the crop (e.g. by selling the residual materials as animal feed). However, such returns are relatively small and farmers are continually looking to improve such peripheral revenues. Thus, it would be advantageous to target specific revenue generating components of a crop, in addition to the grain, in an effort to increase the return of a given crop. Additionally, it would be advantageous to provide an apparatus and method for selectively harvesting a specified revenue generating component of a crop at substantially the same time as the harvesting of the grain material. For example, it would be advantageous to provide a combine harvester or other machine which provides for the harvesting of at least one additional specified revenue generating component of the plant material, along with the harvesting of the grain, during a single pass over the crop field.

BRIEF SUMMARY OF THE INVENTION

In accordance with one aspect of the invention a method is provided for selectively harvesting multiple components of a plant material. The method includes gathering an amount of plant material from a crop field utilizing a harvesting machine. A grain component is harvested from the plant material and then conveyed to a storage area such as, for example, a storage tank located on or within the harvesting machine. At least one additional plant component is also selectively separated from the plant material. The residual material (i.e., the plant material other than grain and other than the at least one additional plant component) is discharged from the harvesting machine back to the crop field. The at least one additional plant component may be, for example, an internodal stem component of the plant material wherein stem of the plant material is broken adjacent the nodes and the nodes are then separated from the internodal stem portions.

The method may include effecting each of the above steps within the harvesting machine during a single pass across a crop field. In other words, the harvesting machine need not return to the field to effect the selective separation of the at least one additional component of the plant material. Further, the method may include consolidating and packaging the at least one additional plant component, which may also be effected by the harvesting machine if so desired.

In accordance with another aspect of the invention, a method of harvesting a plant material is provided. The method includes gathering an amount of plant material, separating a grain component from the plant material and storing the grain component. The method further includes separating an internodal stem component from the plant material. The internodal stem component may be subsequently consolidated and packaged such as, for example, by a baler. In packaging the internodal stem component, a biodegradable and/or combustible packaging material may be at least partially wrapped about a consolidated mass of the internodal stem component.

Another aspect of the invention comprises a harvesting machine. The harvesting machine includes a primary threshing and separating mechanism configured to separate a grain component from a plant material. A secondary threshing and separating mechanism is configured to selectively separate at least one additional component from the plant material. For example, the secondary threshing and separating mechanism may be configured to break a stem component of the plant material at a location adjacent a node of the stem component and then separate the node therefrom. The node and the resulting internodal stem component may then be separated from one another.

The harvesting machine may further include additional cleaning and separating mechanisms such as, for example, sieves, associated with the cleaning of the grain component, the at least one additional component, or both.

Further, the harvesting machine may include a packing mechanism positioned and configured to receive the at least one additional component from the secondary threshing and separating mechanism. The packing mechanism may be configured to consolidate and package the at least one additional component for subsequent use.

Another embodiment of the present invention encompasses a harvesting system. The harvesting system includes a harvesting machine having a primary threshing and separating mechanism configured to separate a grain component from a plant material. A secondary threshing and separating mechanism is configured to selectively separate at least one additional component from the plant material. A packing mechanism is configured to receive the at least one additional component from the secondary threshing and separating mechanism. The packaging mechanism may be operatively associated with a secondary vehicle. The secondary threshing and separating mechanism may be operatively associated with the harvesting machine or, alternatively, with the secondary vehicle. Such a secondary vehicle may be mechanically coupled to, and pulled by, the harvesting machine.

BRIEF DESCRIPTION OF THE SEVERAL VIEWS OF THE DRAWINGS

The foregoing and other advantages of the invention will become apparent upon reading the following detailed description and upon reference to the drawings wherein like elements and features are identified by similar reference numerals, in which.

DETAILED DESCRIPTION OF THE INVENTION

Figure 1:
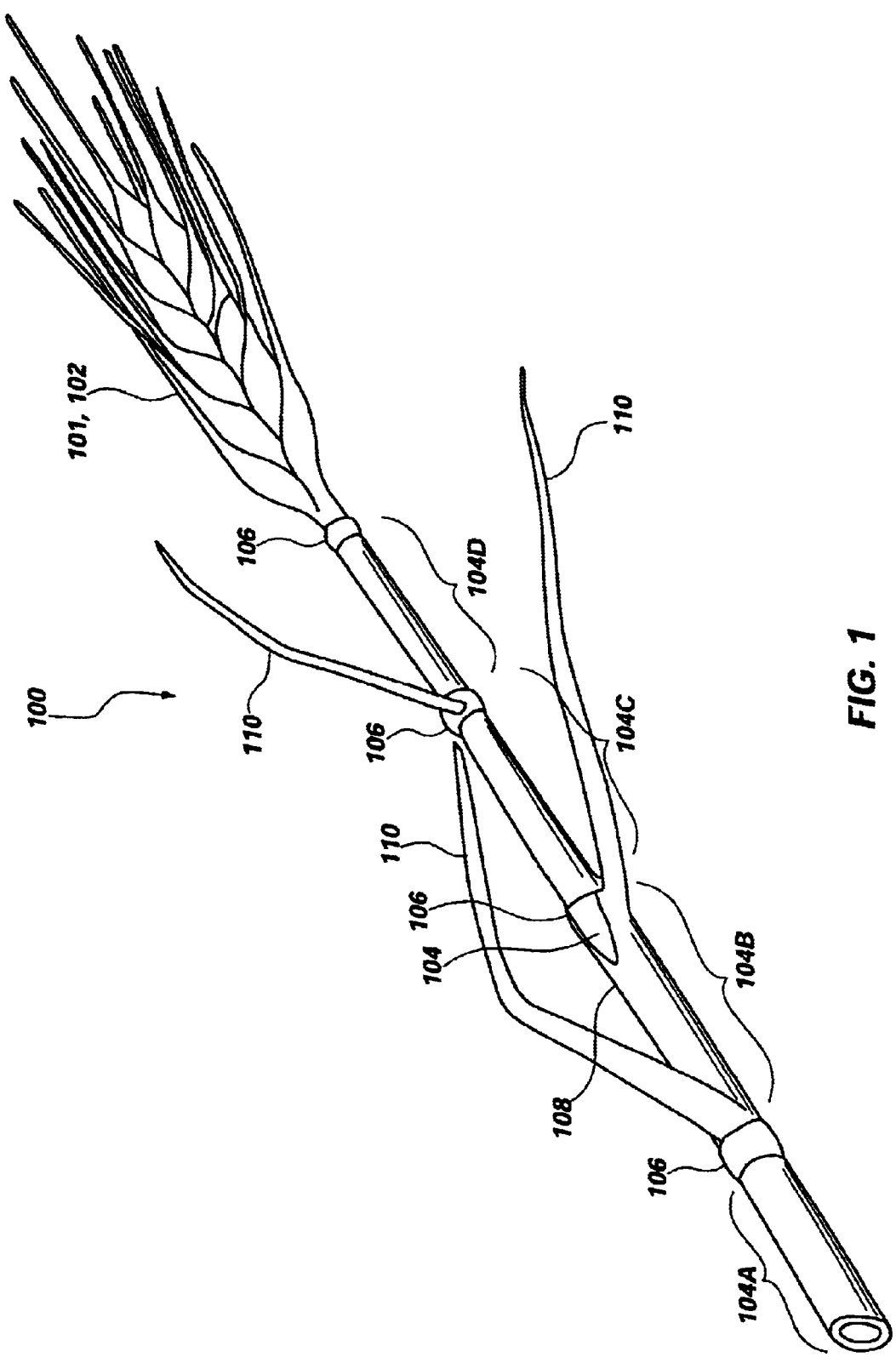
FIG. 1 shows an exemplary plant material prior to harvesting.

Referring to FIG. 1, an exemplary crop or plant material 100 is shown prior to the harvesting of any particular component thereof. The crop or plant material 100 which is to be harvested may include, for example, wheat, barley or corn. It is noted however, that the invention is not limited to such specific crops but, rather, may be utilized in connection with various types of grain crops, cereal crops and legumes.

The plant material 100 depicted in FIG. 1 is representative of a grain crop and comprises a grain material 101 housed within, or covered by, chaff material 102. The plant material 100 further includes a stem 104 (the culm, referred to as straw) having nodes 106 formed therein dividing the stem into internodal sections 104A–104D. The stem 104 may be wrapped, or at least partially wrapped, by a sheath 108 having one or more leaves 110 branching off therefrom.

While the grain 101 is the component that is conventionally harvested from the plant material 100, other components of the plant material 100 also exhibit desirable qualities and may be useful if they are able to be adequately separated and harvested. For example, the sheaths 108 and leaves 110 conventionally exhibit a higher concentration of nutrients and minerals than do other parts of the plant 100. Sheaths 108 and leaves 110, therefore, may be utilized to enrich the soil for future crops.

Also, the stem 104 of various types of plant material 100 is rich in cellulose. This cellulose may be extracted for various revenue generating purposes. For example, the cellulose may be used in extruded plastics, or in production of ethanol for use as a renewable energy source. However, efficient extraction of cellulose from the stem 104 requires selective harvesting of the stem 104 from the sheath 108, leaves 110 and other components. Further, extraction of cellulose from the stem 104 becomes easier if the stem is broken apart and separated from the nodes 106. Thus, for efficient extraction of plant cellulose, it becomes desirable to selectively harvest the internodal stem sections 104A-104D separate from the other components.

It is additionally noted that, particularly with small grain material, when selectively harvesting a plant component, such as the internodal stems 104A–104D, it is desirable to perform the harvest prior to discharging the specific plant component back to the crop field as it is generally inefficient to try and recapture the specific plant component from the ground during a second pass across the field.

Figure 2:
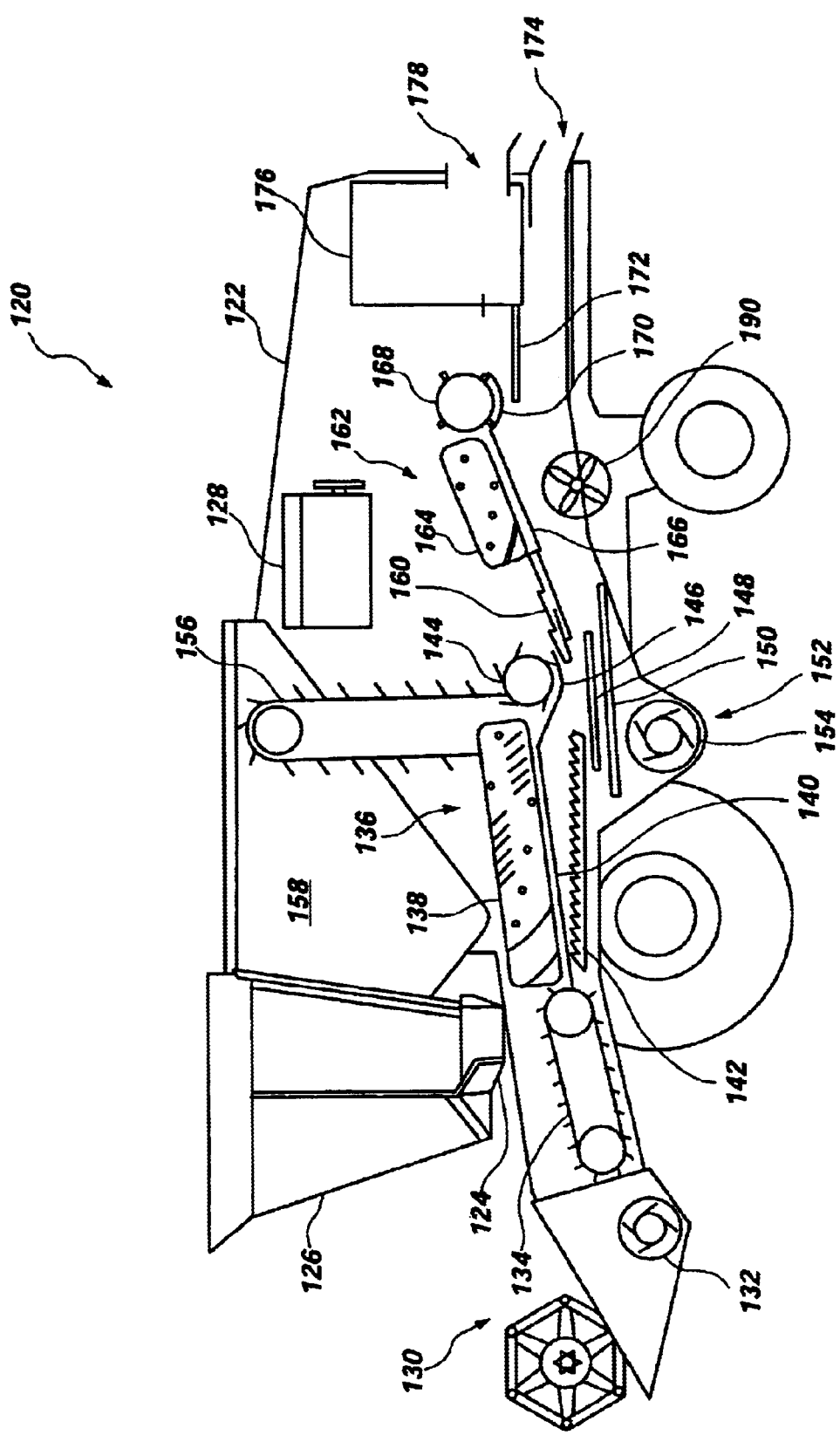
FIG. 2 is a partial cross-sectional view of a harvesting machine according to an embodiment of the present invention.

Referring now to FIG. 2, a harvesting machine 120 is shown according to one embodiment of the present invention. The harvesting machine 120 includes a chassis 122 supporting an operator's platform 124 and cab 126 from which an operator controls a plurality of other components housed within and/or supported by the chassis 122 which shall be described in more detail below. The harvesting machine also includes a power source 128, such as an internal combustion engine, to propel the harvesting machine 120 as well as provide power to the various components and mechanisms thereof.

In operation, a header 130 located at the forward end of the harvesting machine 120 cuts down a standing crop, or picks up a previously cut crop, of plant material 100 (see FIG. 1) as the harvesting machine 120 is propelled across a crop field. A conveying mechanism within the header 130, such as an auger 132, conveys the cut crop transversely across the header 130 to a second conveying mechanism 134 such as, for example, a feeder. The second conveying mechanism 134 transports the cut crop to a primary threshing and separating mechanism 136. The primary threshing and separating mechanism shown in FIG. 2 includes an longitudinally oriented rotor 138 and cooperatively configured and positioned concave 140 which, while not shown in FIG. 2, may wrap partially around the rotor. The concave 140 may be formed as a grate or a relatively coarse sieve such that the grain material may flow therethrough as the crop is subjected to a rubbing action between the rotor 138 and the concave 140. In operation, the harvesting machine 120 may include at least two such threshing and separating mechanisms 136 set in a side-by-side orientation.

It is noted that while the harvesting machine 120 is shown and described to include a longitudinal rotor primary threshing and separating mechanism 136, other conventional mechanisms, such as, for example, transversely oriented threshing and separating mechanisms, may also be utilized in conjunction with the present invention as will be appreciated by those of ordinary skill in the art.

Figure 3:
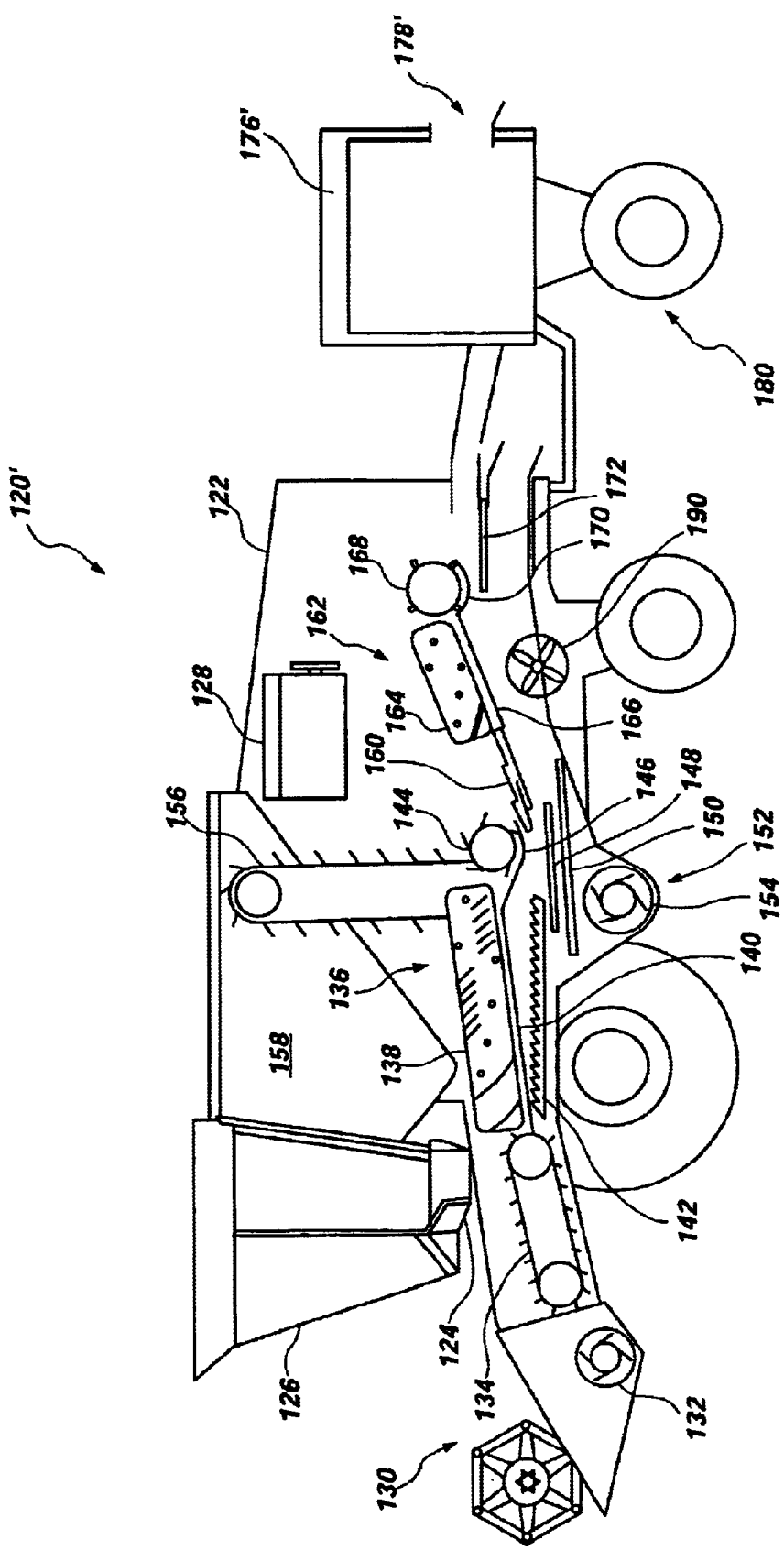
FIG. 3 shows a harvesting machine according to another embodiment of the present invention.
Figure 4:
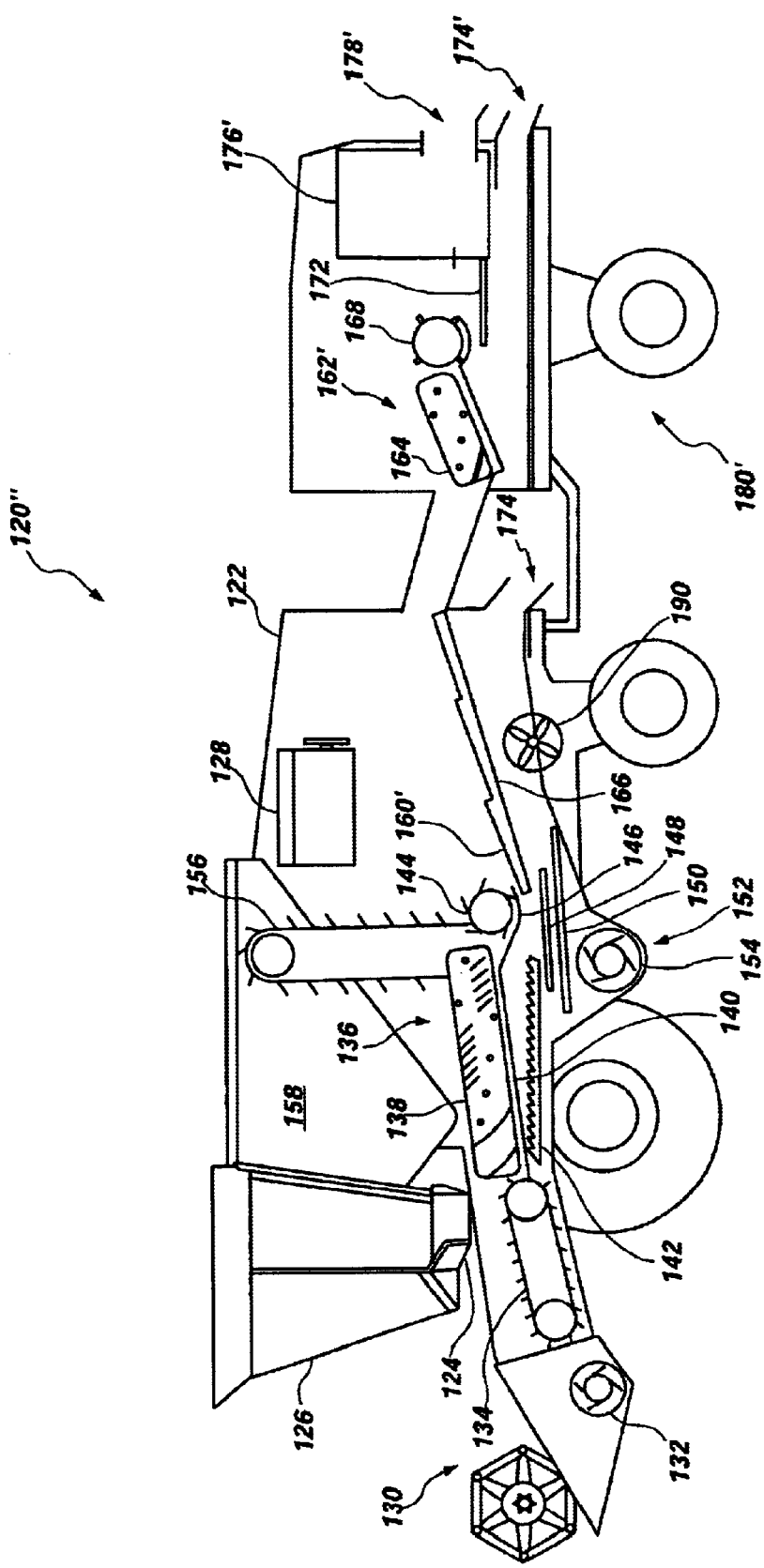
FIG. 4 shows a harvesting machine in according to yet another embodiment of the present invention.

As the crop is processed through the threshing and separating mechanism 136, grain falls through the concave 140 and onto a grain pan 142 which may, for example, be coupled with a vibrating energy source for conveyance of the grain along the grain pan 142 toward the aft end of the harvesting machine 120. The plant material not falling through the concave 140 is conveyed to a beater 144 positioned above and within a grate 146 for further separation of the grain. Grain falling through the grate 146, as well as grain transported rearward by the grain pan 142, is then sifted through one or more sieves 148 and 150 for additional cleaning and separation of the grain. In conjunction with the sieves 148 and 150, an air source, such as but not limited to a forced air source 190, as depicted in FIGS. 2–4, including at least one fan or other means for generating a source of forced air directable by baffles, conduits or other guides that may be used to direct forced air upwards through the sieves 148 and 150 to further remove chaff and other impurities that may be intermixed with the grain. Such chaff and other relatively light impurities are conveyed rearward to be discharged from the harvesting machine 120 while the grain passes through the sieves 148 and 150 into a grain collection zone 152. A conveying mechanism 154, such as an auger, conveys the grain laterally to yet another conveying mechanism 156, such as a grain elevator, which discharges the grain into a central storage vessel 158.

While the grain is discharged through the concaves 140 and the grate 146, the straw is discharged from the beater 144 to a straw conveyor 160 such as, for example a straw walker, as will be appreciated by those of skill in the art. The straw conveyor 160 transports the straw, which largely comprises the stems of the harvested crop material, to a secondary threshing and separating mechanism 162. The straw conveyor 160 may also be configured as another sieve so as to provide additional separation of the crop material passing therealong.

The secondary threshing and separating mechanism 162 may include a rotor 164 and concave 166 as did the primary threshing and separating mechanism 136. However, the secondary threshing and separating mechanism 162 may include different design features than the primary threshing and separating mechanism 136. For example, if both primary and secondary threshing and separating mechanisms 136 and 162 are designed as longitudinally disposed rotors with mating concaves such as shown, the rotor 164 and concave 166 of the secondary threshing and separating mechanism 162 may be designed to be smaller, in length and/or diameter than the rotor 138 and concave 140 of the primary threshing and separating mechanism 136. Further, the secondary threshing and separating mechanism 162 may be designed to be more aggressive than the primary threshing and separating mechanism 136 in that the tines or other rubbing components positioned thereon may exhibit different spacing or configuration than those of the primary rotor 138. Similarly, the concave 166 of the secondary threshing and separating mechanism 162 may exhibit a different grating arrangement, such as the size of openings therein, with respect to the concave 140 of the primary threshing and separating mechanism 136. The difference in aggressiveness between the primary threshing and separating mechanism 136 to the secondary separating and threshing mechanism 162 is based, at least in part, on which plant components are to be harvested by each.

For example, as previously discussed, the primary threshing and separating mechanism 136 is designed to separate and harvest the grain material, while the secondary separating and threshing mechanism is configured to harvest a separate component of the crop material, such as, for example the stems, or more particularly the internodal stems (i.e., 104A–104D shown in FIG. 1). Thus, after separating grain from the crop material, the secondary threshing and separating mechanism 162, when used to harvest the internodal stems, serves to break the stems of the crop material at locations proximate the nodes 106 (FIG. 1) and then discard the nodes and other impurities through the secondary concave 166 while retaining the internodal stems 104A–104D.

A secondary beater 168 with an associated grate 170 may be used to further separate the stems from the nodes. A sieve 172 (or plurality of sieves) may be positioned to receive the discharged material from the secondary beater 168 and grate 170 (or alternatively, if a secondary beater 168 is not used, directly from the secondary threshing and separating mechanism 162) for further cleaning and separation. The sieve(s) 172 may be combined with a forced air source, as previously described with respect to sieves 148 and 150, to help separate the plant component being harvested from the undesired components. Thus, in harvesting internodal stems, the nodes and other components (e.g., remaining chaff, sheaths and/or leaves) may pass through the sieve 172 for combination with the undesired material previously separated from the grain, the combined stream of undesired or non-harvested plant components being discharged through an outlet port 174 back to crop field.

It is noted that, while not shown, the harvesting machine 120 may also include a system or mechanism associated with "rethreshing" the plant material as will be appreciated by those of ordinary skill in the art. It is further noted that such rethreshing systems and mechanisms are not to be confused with the secondary threshing and separating mechanism 162 disclosed herein. Particularly, as noted above, rethreshing systems are designed to collect and process an amount of crop material discharged from the primary threshing and separating mechanism in an attempt to obtain an additional amount of grain therefrom. In contradistinction, the secondary threshing and separating mechanism disclosed herein is directed to selectively harvesting another component (i.e., other than grain) from the plant material of the crop.

Upon discharge from the secondary threshing and separating mechanism 162 and/or secondary beater 168, the harvested plant component (e.g., the internodal stems) may be conveyed to a packaging mechanism 176. The packaging mechanism 176 may be configured to consolidate and package the harvested plant components into a bale or other similar package that is conveyed through a discharge port or chute 178. The packaged plant component material may be discharged to the crop field for subsequent collection, or alternatively, discharged to a storage vehicle, such as a trailer being mechanically coupled to and pulled behind the harvesting machine 120, or a truck driven alongside the harvesting machine 120.

As shown in FIG. 3, which depicts a harvesting machine 120' according to another embodiment of the present invention, the harvesting machine 120' need not have a packaging mechanism integrally associated therewith. Rather, a second vehicle 180 housing a packaging mechanism 176' may be mechanically coupled with and pulled behind the harvesting machine 120'. In such a case, the component being harvested may be discharged from the harvesting machine 120' after passing through the secondary threshing and separating mechanism 162 and/or the secondary beater 168. The selectively harvested plant component is then collected by the second vehicle 180 and packaged accordingly.

In yet another embodiment of the present invention, shown in FIG. 4 as harvesting machine 120", the secondary threshing and separating mechanism 162' may be housed in a second vehicle 180'. Thus, after passing through the primary threshing and separating mechanism 136 of the harvesting machine 120", the portion of the crop containing the desired components for additional harvesting (e.g. the straw/stems) may be discharged from the harvesting machine 120" to the second vehicle 180' for processing via the secondary threshing and separating mechanism 162'. The second vehicle 180' may further include a packaging mechanism 176' for consolidating and packaging the harvested material prior to discharge from the second vehicle 180'. Additionally, the second vehicle may include an outlet port 174' for discharging undesired plant material (e.g., nodes and chaff) separated out via the secondary threshing and separating mechanism 162'.

As has been noted above, when selectively harvesting one or more additional components from a given crop such as, for example, the internodal stems, it is often desirable to not discharge the harvested components back to the crop field without proper consolidation and packaging in order to ensure an efficient harvest. Thus, if a packaging mechanism is not being utilized, it may be desirable to immediately store the harvested crop, such as in an auxiliary storage tank associated with the harvesting machine 120 or, alternatively, in a storage vehicle pulled by, or driven adjacent to, the harvesting machine 120.

Additionally, if the plant component (other than grain) being harvested includes the stems, it may be desirable to package the harvested components with material that is biodegradable and/or combustible depending on the intended use of the harvested component material. For example, if the component material is to be used as a combustible energy source, it may be desirable that the packaging material also be combustible such that the component material need not be "unwrapped" or "unpackaged" before use. Such packaging material might include, for example, a web or mesh-type paper-based product that may be wrapped about a mass of the plant component material after consolidation thereof.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of selectively harvesting multiple components of a plant material, the method comprising, while moving across a crop field of the plant material:
   gathering an amount of plant material from the crop field;
   separating a grain component from the plant material;
   selectively separating internodal stems from the plant material; and
   discharging remaining plant material, less at least the grain and the internodal stems, back to the crop field.

2. The method according to claim 1, wherein the selectively separating internodal stems from the plant material further comprises removing at least one node from the plant material and separating the internodal stems from the at least one node.

3. The method according to claim 1, further comprising packaging the internodal stems.

4. The method according to claim 3, wherein the internodal stems includes baling the internodal stems.

5. The method according to claim 3, wherein the packaging the internodal stems includes consolidating a mass of the internodal stems and wrapping a biodegradable packaging material at least partially about the consolidated mass.

6. The method according to claim 3, wherein the packaging the internodal stems includes consolidating a mass of the internodal stems and wrapping a combustible packaging material at least partially about the consolidated mass.

7. The method according to claim 3, wherein the gathering an amount of plant material, the separating a grain component, the selectively separating internodal stems and the packaging the internodal stems are each effected by a harvesting machine.

8. The method according to claim 3, wherein the gathering an amount of plant material, the separating a grain component and the selectively separating internodal stems are each effected by a harvesting machine and wherein the packaging the internodal stems is effected by a second machine associated with the harvesting machine.

9. The method according to claim 3, wherein the gathering an amount of plant material and the separating a grain component are each effected by a harvesting machine and wherein the selectively separating internodal stems and the packaging the internodal stems are effected by a second machine associated with the harvesting machine.

10. The method according to claim 3, further comprising discharging the internodal stems from the harvesting machine back to the crop field.

11. The method according to claim 10, wherein the packaging the internodal stems occurs prior to the discharging the internodal stems.

12. The method according to claim 1, wherein the gathering an amount of plant material, the separating a grain component and the selectively separating internodal stems are each effected by a harvesting machine.

13. A method of harvesting a plant material comprising:
   gathering an amount of the plant material;
   separating a grain component from the plant material; and
   selectively separating internodal stems from a remaining portion of the plant material.

14. The method according to claim 13, wherein the separating the grain component and the separating the internodal stems are effected while moving across a field of the plant material.

15. The method according to claim 14, further comprising packaging the internodal stems.

16. The method according to claim 15, further comprising consolidating the internodal stems prior to the packaging thereof.

17. The method according to claim 16, wherein the packaging the internodal stems includes wrapping a combustible material at least partially thereabout.

18. The method according to claim 16, wherein the packaging the internodal stems includes wrapping a biodegradable material at least partially thereabout.

19. The method according to claim 14, wherein the separating a grain component and the separating internodal stems are effected within a single harvesting machine.

20. A mobile harvesting machine comprising:
   a primary threshing and separating mechanism configured to separate a grain component from a plant material; and
   a secondary threshing and separating mechanism configured to selectively separate internodal stems from the plant material.

21. The mobile harvesting machine of claim 20, wherein the secondary threshing and separating mechanism is further configured to remove at least one node from the plant material and separate the internodal stems from the at least one node.

22. The mobile harvesting machine of claim 20, further comprising at least one sieve configured and positioned to receive the grain component from the primary threshing and separating mechanism and configured to further clean and separate the grain component from a residual amount of the plant material.

23. The mobile harvesting machine of claim 22, further comprising at least one other sieve configured and positioned to receive the internodal stems from the secondary threshing and separating mechanism and configured to further clean and separate the internodal stems from the residual amount of the plant material.

24. The mobile harvesting machine of claim 23, further comprising a forced air system located and configured to augment the separation of the internodal stems from the residual amount of the plant material.

25. The mobile harvesting machine of claim 24, further comprising a conveying mechanism configured and positioned to convey a straw component of the plant material from the primary threshing and separating mechanism to the secondary threshing and separating mechanism.

26. The mobile harvesting machine of claim 25, wherein the primary threshing and separating mechanism includes at least one rotor disposed adjacent a grate.

27. The mobile harvesting machine of claim 25, wherein the secondary threshing and separating mechanism includes at least one rotor disposed adjacent a grate.

28. The mobile harvesting machine of claim 20, further comprising a packaging mechanism positioned and configured to receive the internodal stems from the secondary threshing and separating mechanism and configured to consolidate and package the internodal stems.

29. A mobile harvesting system comprising:
   a harvesting machine having a primary threshing and separating mechanism configured to separate a grain component from a plant material;
   a secondary threshing and separating mechanism configured to selectively separate internodal stems from the plant material; and
   a packaging mechanism configured to receive the internodal stems from the secondary threshing and separating mechanism.

30. The mobile harvesting system of claim 29, further comprising a secondary vehicle, wherein the packaging mechanism is operatively associated with the secondary vehicle.

31. The mobile harvesting system of claim 30, wherein the secondary threshing and separating mechanism is operatively associated with the harvesting machine.

32. The mobile harvesting system of claim 30, wherein the secondary threshing and separating mechanism is operatively associated with the secondary vehicle.

33. The mobile harvesting system of claim 30, wherein the secondary vehicle is mechanically coupled to and pulled by the harvesting machine.

34. A harvesting system comprising:
   a harvesting machine having a primary threshing and separating mechanism configured to separate a grain component from a plant material; and
   a secondary threshing and separating mechanism configured to selectively separate internodal stems from the plant material.

35. The harvesting system of claim 34, further comprising a packaging mechanism configured to receive the internodal stems from the secondary threshing and separating mechanism.

36. A method of selectively harvesting multiple components of a plant material, the method comprising, while moving across a crop field of the plant material:
   gathering an amount of plant material from the crop field;
   separating a grain component from the plant material;
   conveying the grain component to a storage vessel;
   selectively separating at least one additional plant component from the plant material including selectively separating internodal stems from the plant material;
   packaging the at least one additional plant component; and
   discharging remaining plant material, less the grain and the at least one additional plant component, back to the crop field;
   wherein the gathering an amount of plant material, the separating a grain component, the selectively separating at least one additional plant component and the packaging the at least one additional plant component are each effected by a harvesting machine.

37. A method of selectively harvesting multiple components of a plant material, the method comprising, while moving across a crop field of the plant material: p1 gathering an amount of plant material from the crop field;
   separating a grain component from the plant material;
   conveying the grain component to a storage vessel;
   selectively separating at least one additional plant component from the plant material including selectively separating internodal stems from the plant material;
   packaging the at least one additional plant component; and
   discharging remaining plant material, less the grain and the at least one additional plant component, back to the crop field;
   wherein the gathering an amount of plant material and the separating a grain component are each effected by a harvesting machine and wherein the selectively separating at least one additional plant component and the packaging the at least one additional plant component are effected by a second machine associated with the harvesting machine.

* * * * *

UNITED STATES PATENT AND TRADEMARK OFFICE
CERTIFICATE OF CORRECTION

PATENT NO. : 6,729,951 B2
DATED : May 4, 2004
INVENTOR(S) : Reed L. Hoskinson et al.

It is certified that error appears in the above-identified patent and that said Letters Patent is hereby corrected as shown below:

<u>Title page,</u>
Item [75], Inventors, add: -- David N. Thompson, William T. McKean --

Signed and Sealed this

Twenty-third Day of November, 2004

JON W. DUDAS
*Director of the United States Patent and Trademark Office*